July 14, 1959  H. A. PELLER  2,894,562
VEHICLE SEATS
Filed June 6, 1955  3 Sheets-Sheet 1

INVENTOR
Henry A. Peller
BY Paul Fitzpatrick
ATTORNEY

July 14, 1959    H. A. PELLER    2,894,562
VEHICLE SEATS
Filed June 6, 1955    3 Sheets-Sheet 2
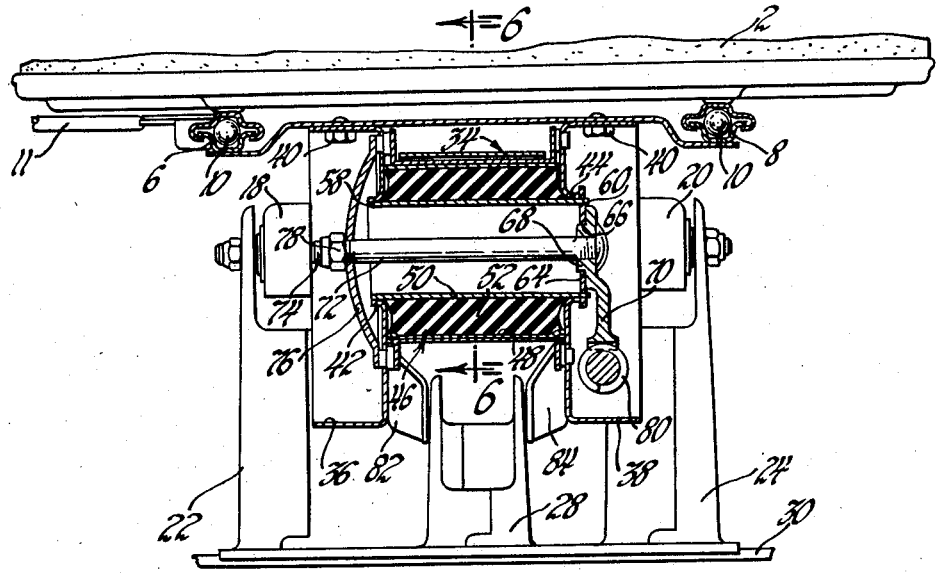
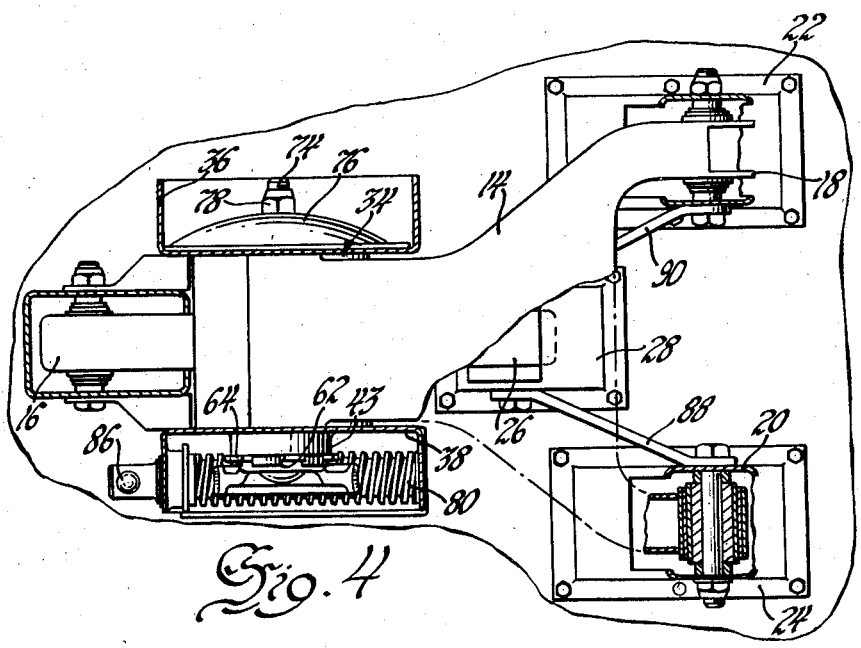
INVENTOR
Henry A. Peller
BY
Paul Fitzpatrick
ATTORNEY

United States Patent Office 2,894,562
Patented July 14, 1959

2,894,562

VEHICLE SEATS

Henry A. Peller, Euclid, Ohio, assignor to General Motors Corporation, Detroit, Mich., a corporation of Delaware Application June 6, 1955, Serial No. 513,454

4 Claims. (Cl. 155—51)

This invention relates to vehicle seats and more particularly, although not exclusively, to adjustable resilient seat mountings for vehicles of the type intended for operation over rough terrain.

An object of the invention is to provide an improved resilient seat mounting for vehicles such as tractors.

Another object is to provide a seat of the stated character which is selectively adjustable to a plurality of vertical positions.

Still a further object is to provide in a seat of the stated character a vertical adjusting mechanism capable of maintaining the seat in a horizontal level attitude throughout its vertical adjustment.

A still further object is to provide in a seat having vertical adjustment mechanism, a resilient mounting adapted to provide substantially uniform yielding resistance to vertical displacement of said seat regardless of its adjusted position.

Yet another object is to provide an adjustable resilient seat structure which is simple and durable in construction, low in cost, and efficient in operation.

These and other objects and advantages of the invention will become more fully apparent as reference is had to the accompanying specification and drawings wherein:

Fig. 3 is a front elevational view, partly in section, of the structure shown in Fig. 2.

Fig. 4 is a plan view, partly in section, looking in the direction of arrows 4—4 of Fig. 2.

Figure 1:
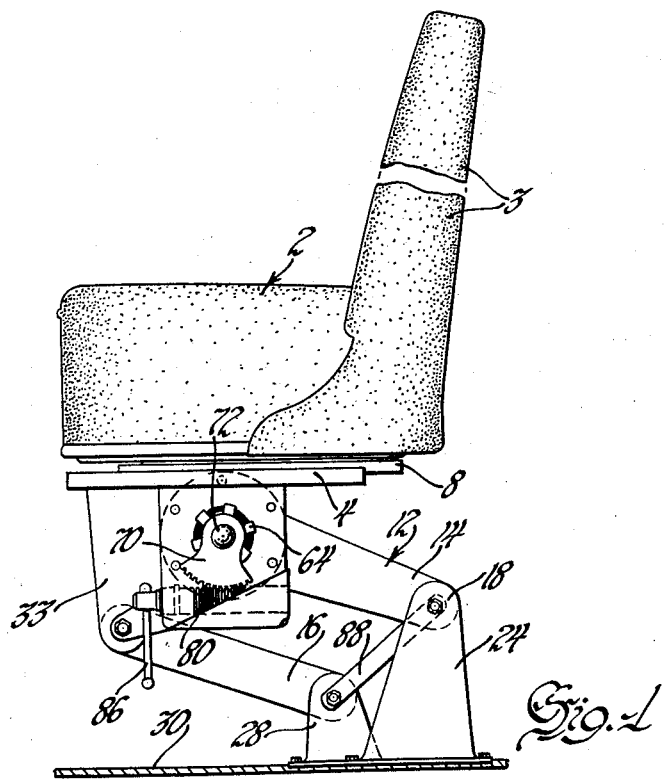
Fig. 1 is a side elevational view of the vehicle seat and supporting structure therefor.
Figure 2:
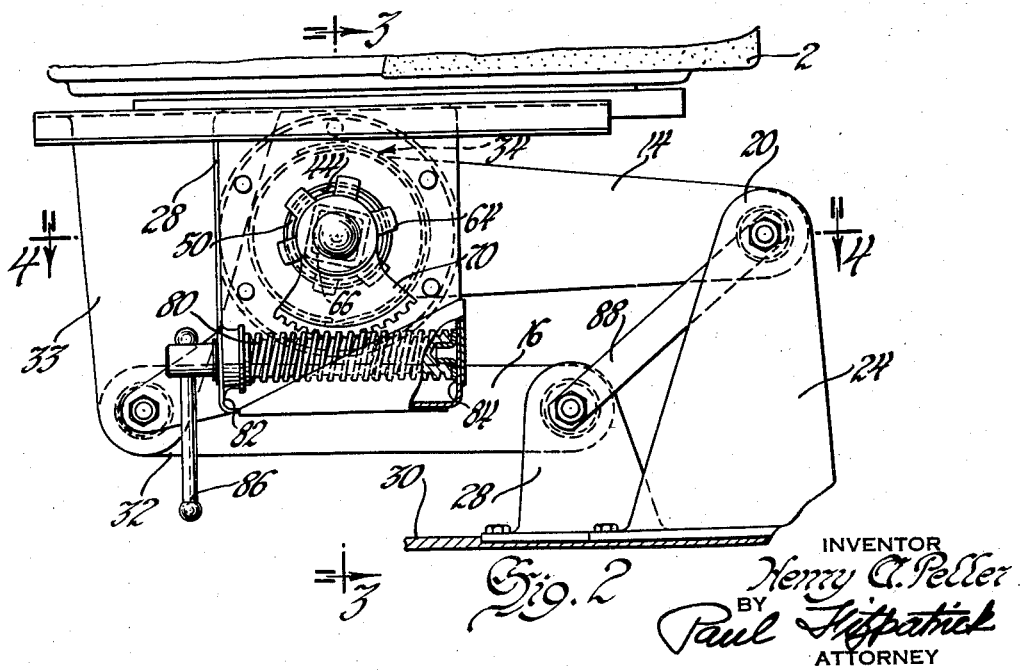
Fig. 2 is an enlarged fragmentary side elevational view, partly in section, illustrating the structure and arrangement of the seat supporting mechanism, certain parts being broken away to more clearly disclose the construction.

Referring now to the drawings and particularly Figs. 1 and 2, there is illustrated a vehicle seat structure in which the reference numeral 2 indicates generally a vehicle seat cushion. Seat 2 is provided with a fixed back portion 3 and is mounted for limited fore and aft adjustable movement on a supporting base 4 by means of laterally spaced generally parallel track structures 6 and 8. Track structures 6 and 8 comprise slidably interfitting upper and lower rails which have disposed therebetween a plurality of balls 10. Balls 10 maintain the rails in their proper relationship and assist in reducing friction during relative movement of the rails. After adjustment of seat 2 to a desired position, rails 6 and 8 are locked against relative movement by latch 11 mounted on base 4.

In accordance with one feature of the invention, seat 2 and supporting base 4 are mounted on a parallelogram linkage 12 which permits the seat to be displaced bodily vertically without affecting the normal level attitude thereof. As seen in the drawings, parallelogram linkage 12 comprises a pair of forwardly and upwardly extending arms 14 and 16 which are arranged in generally parallel relation. Arm 14 is forked at its rearward end to provide a pair of laterally spaced apart transversely aligned bearing portions 18 and 20. Portions 18 and 20 pivotally engage the upper ends of laterally spaced vertically extending brackets 22 and 24. At its rearward end, arm 16 is provided with a single transversely extending bearing portion 26 which pivotally engages the upper end of a relatively short upstanding bracket 28. Bracket 28 is positioned between brackets 22 and 24 and slightly forwardly thereof. Each bracket 22, 24, and 28, in turn, is secured to the vehicle floor 30. At its forward end 32, arm 16 is pivotally connected to the lower end of a depending bracket 33 secured near the forward edge of seat base 4. The forward end of arm 14 is formed with a relatively large diameter transversely extending sleeve portion 34 which is received between a pair of laterally spaced depending brackets 36 and 38. Brackets 36 and 38 are press formed in a box-like configuration to increase the rigidity thereof and, in turn, are connected centrally on the lower surface of base 4 by means of bolts 40. As seen in Fig. 3, box structures 36 and 38 are provided with laterally aligned outwardly flanged openings 42 and 44, the purpose of which will be described shortly.

Figure 6:
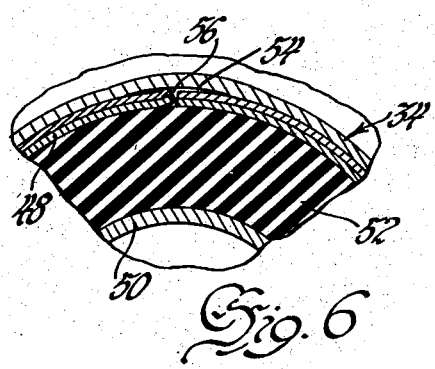
Fig. 6 is an enlarged fragmentary view looking in the direction of arrows 6—6 of Fig. 3.

Prior to assembly of the seat supporting linkage, the large diameter sleeve portion 34 of arm 14 is fitted with an annular torsional member 46. Torsional member 46 comprises an outer cylindrical metal sleeve 48, an inner cylindrical metal sleeve 50, and an intermediate annular rubber mass 52 which is bonded, respectively, to the adjacent peripheral surfaces of sleeves 48 and 50. As seen best in Fig. 6, sleeve portion 34 is provided with a transversely extending outwardly deformed groove 54. Outer tubular member 48 is of split ring configuration and has one of the abutting edges 56 thereof turned radially outwardly. In assembled relation, outwardly turned edge 56 extends into the groove 54. In this manner, rotation of torsional assembly 46 in sleeve 34 is prevented, while insertion thereof into sleeve 34 and removal therefrom may be accomplished without difficulty. As seen best in Fig. 3, inner cylindrical member 50 is of slightly greater length than outer tubular member 48 and is arranged in unsymmetrical relation thereto so that one lateral extremity 58 is slightly shorter than the other extremity 60. Each lateral extremity 58 and 60 extends transversely through the adjacent flanged openings 42 and 44 of brackets 36 and 38, previously mentioned. Consequently, when brackets 36 and 38 are secured to the underside of base 4 by bolts 40, the forward end of arm 14 is rotatably secured between the brackets.

Figure 5:
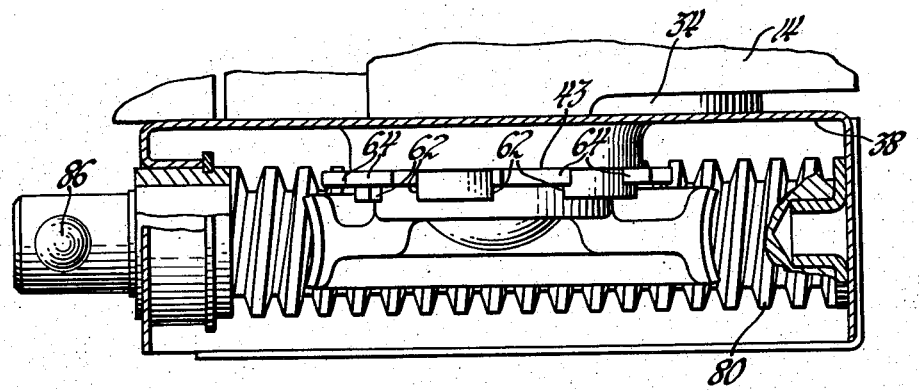
Fig. 5 is an enlarged fragmentary view of a portion of Fig. 4.

In order to provide yielding resistance to vertical load imposed on seat 2 in accordance with another feature of the invention, the lateral extremity 60 of cylindrical member 50 is notched laterally at circumferentially spaced intervals. As seen in Fig. 5, each notch 62 extends to a depth substantially flush with the side face 43 of flanged opening 44. Cooperating with the notched end portion of cylindrical member 50 is a washer 64 having a corresponding outer notched periphery. Centrally thereof, washer 64 is formed with a square aperture 66 which is adapted to receive the square pilot portion 68 of a gear segment 70. Washer 64 and gear segment 70 are retained in cooperating engagement with member 50 by means of a machine bolt 72 which extends axially through member 50. At its threaded end 74, bolts 72 extend through a large diameter semi-spherical washer 76, the outer periphery of which engages the outer side wall of bracket 36. Upon tightening of nut 78 on threaded portion 74, all of the parts are drawn into assembled relation and compressively retained by the spring action of washer 76. Operatively engaging gear segment 70 is a longitudinally extending manually operable worm drive 80, the opposite ends of which are supported on the forward and rearward wall sections 82 and 84 of bracket 38. At its forward extremity, worm drive 80 is provided with a conventional sliding pin operating handle 86.

In operation, when it is desired to obtain a desired vertical seat position, or affect changes therein, handle 86 is rotated either clockwise or counterclockwise as the case may be. Upon rotation of worm 80, as for instance in a clockwise direction, segment 70 is caused to rotate in clockwise direction as seen in Figs. 1 and 2. Since segment 70 is keyed to inner cylindrical member 50, rotation of the segment tends to impart rotation to the entire torsional assembly 46. However, since the outer cylindrical member 48 is prevented from rotating relative to arm 14 by edge portion 56 seated in groove 54, the effect of clockwise swinging movement of segment 70 is to cause arm 14 to swing clockwise about the pivotal connections of its rearward ends 18 and 20 with brackets 22 and 24. Clockwise rotation of arm 14 obviously causes the seat 2 to rise vertically. Similarly, counterclockwise movement of handle 86 causes seat 2 to be lowered. Because of the parallelogram formed by arms 14 and 16, during vertical movement seat 2 is maintained in a constant level attitude. After seat 2 has been adjusted vertically to the desired position, yielding resistance to load on seat 2 is afforded by torsional flexure of annular rubber mass 52. Thus, when segment 70 is maintained in fixed relation relative to brackets 36 and 38, inner cylindrical member 50 is prevented from rotating relative to the brackets, while outer cylindrical member 48 is prevented from rotating relative to arm 14. However, relative rotation between outer tubular member 48 and inner tubular member 50 is resisted only by the inherent torsional resistance of rubber mass 52. Consequently, regardless of the adjusted vertical height of seat 2, the initial torsional stresses on mass 52 will be identical, and therefore the seat suspension will always afford substantially uniform yielding resistance for cushioning of the weight supported by the seat. It will, of course, be understood that any desired degree of yieldability may be obtained by dimensional variations such as changes in the relative diameters of tubular members 48 and 50.

Since seat structures of the type described are intended primarily for the use in vehicles operated over rough terrain, it is essential that the structure be capable of withstanding severe shocks. To this end, the parallelogram supporting brackets 22, 24, and 28 are reinforced by braces 88 and 90 which extend between the respective pivotal connections thereof. It should also be particularly noted that by virtue of the forked rearward extremities of arm 14 and the forwardly spaced position of the rearward end of arm 16, the brackets 22, 24, and 28 are disposed in a triangular arrangement as seen in the plan view. This arrangement affords maximum resistance to side thrust, twisting and other forms of stresses imposed on the seat and mounting structure and yet occupies a minimum of space.

From the foregoing it will be seen that a simple, efficient and rugged seat structure has been devised. The device not only permits a substantial range of adjustment both horizontally and vertically, but in addition affords optimum operator comfort. Further, the structure and arrangement is such that assembly and disassembly thereof may be accomplished with great ease.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In a vehicle seat structure of the type including parallelogram guiding linkage effective to cause substantially rectilinear vertical movement of said seat, means providing yielding support for said seat in any position of elevation, said means comprising an annular torsional member, said member having a relatively rigid outer and inner peripheral portion, said outer peripheral portion being secured against rotation in one of said links, means rotatably connecting the inner peripheral portion of said torsional member to said seat, a gear segment, means connecting said gear segment and said inner peripheral portion in axially separable angularly interlocked relation, and means carried by said seat operatively engaging said gear segment for adjusting and retaining the rotary position of the inner peripheral portion of said member relative to said seat.

2. In a vehicle seat structure of the type including parallelogram guiding linkage for varying the vertical position of said seat, fore and aft adjustment means interposed between said seat and said guiding linkage, means providing yielding support for said seat in any of its positions of adjustment, said means comprising a rubber torsion spring, said spring having an inner cylindrical member journalled on said seat, and an outer cylindrical member secured at the forward end of one of said links, said inner cylindrical member having an end thereof formed to receive a gear segment, means retaining said cylindrical member and segment in an interlocking engagement, and a worm drive operatively engaging said segment, said worm drive being supported on said seat and being manually rotatable to adjust the vertical position of said seat.

3. In a vehicle seat structure of the type including parallelogram guiding linkage for varying the vertical position of said seat, fore and aft adjustment means interposed between said seat and said guiding linkage, means providing yielding support for said seat in any of its positions of adjustment, said means comprising a rubber torsion spring, said spring having an inner cylindrical member journalled on said seat, and an outer cylindrical member secured at the forward end of one of said links, said inner cylindrical member having an end thereof formed to receive a gear segment, axially separable angular interlocking means retaining said cylindrical member and segment in engagement, and a worm drive operatively engaging said segment, said worm drive being supported on said seat and being manually rotatable to adjust the vertical position of said seat.

4. In a vehicle seat structure of the type including parallelogram guiding linkage effective to cause substantially rectilinear movement of said seat, means providing yielding support for said seat in any position of elevation, said means comprising an annular torsional member, said member having a relatively rigid outer and inner peripheral portion, said outer peripheral portion being secured against rotation in one of said links, means rotatably connecting the inner peripheral portion of said torsional member to said seat, and worm and gear means carried by said seat for adjusting and retaining the rotary position of the inner peripheral portion of said member relative to said seat.

References Cited in the file of this patent

UNITED STATES PATENTS

| | | |
|---|---|---|
| 1,828,585 | Appling | Oct. 20, 1931 |
| 2,008,209 | Herold | July 16, 1935 |
| 2,453,116 | Buckendale | Nov. 9, 1948 |
| 2,477,187 | Lanchner | July 26, 1949 |
| 2,588,638 | Krotz et al. | Mar. 11, 1952 |
| 2,630,854 | Neher | Mar. 10, 1953 |
| 2,667,209 | Gundersen | Jan. 26, 1954 |